United States Patent [19]

Tsukisaka

[11] 4,041,967
[45] Aug. 16, 1977

[54] APPARATUS FOR PREVENTING FUEL FROM LEAKING ON TURNOVER OF A VEHICLE

[75] Inventor: Tsuneo Tsukisaka, Kawagoe, Japan

[73] Assignee: Honda Giken Kogyo Kabushiki Kaisha, Tokyo, Japan

[21] Appl. No.: 685,047

[22] Filed: May 10, 1976

[30] Foreign Application Priority Data

May 14, 1975 Japan .................................. 50-56022

[51] Int. Cl.² ............................................. F16K 17/36
[52] U.S. Cl. .............................. 137/39; 123/198 DB; 137/45
[58] Field of Search .................. 123/198 DB; 137/38, 137/39, 45; 180/104

[56] References Cited

U.S. PATENT DOCUMENTS

| 2,343,663 | 3/1944 | Gregory | 137/45 X |
| 3,957,072 | 5/1976 | Ellsworth | 137/38 |

Primary Examiner—Robert G. Nilson

[57] ABSTRACT

Apparatus for preventing fuel from leaking on accidental turnover of a vehicle, the latter having a fuel tank, a carburetor and a passage communicating the tank with the carburetor, the apparatus comprising an ordinarily open safety valve such as a ball valve interposed in the passage, so arranged that, on the turnover of the vehicle, a pendulum-type weight detects the inclination of the vehicle, operating a cam to automatically close the safety valve. An optional fuel cock may be provided, for manual operation, interposed in the fuel passage, while the safety valve has a housing integrally formed therewith on one of its sides.

3 Claims, 5 Drawing Figures

APPARATUS FOR PREVENTING FUEL FROM LEAKING ON TURNOVER OF A VEHICLE

The invention relates to an apparatus, chiefly for two-wheeled vehicles such as motorcycles and the like, for preventing fuel from leaking on the accidental turnover of the vehicle.

It is customary in such vehicles that a fuel passage communicates the fuel tank with the float chamber of the carburetor, provided only with a manually operable cock. Accordingly, the latter must be closed by hand when the vehicle has overturned; if the cock remains open, the fuel from the tank flows continually into the flow chamber so that the latter overflows. As a result thereof, a substantial fire danger is caused.

The present invention has for its object to provide an apparatus that is free from this danger.

According to major features of the invention, a fuel passage communicating between the fuel tank and the carburetor of the vehicle is provided with an ordinarily open safety valve such as a ball valve, so arranged that, on the turnover of the vehicle, a pendulum-type weight detects the relative inclination, thereby operating a cam to automatically close the safety valve.

As an optional feature, a manually operable fuel cock may be provided in the fuel passage, while the valve housing can be formed integrally therewith on one of its sides.

Further objects, important features and advantages of the inventive apparatus will be understood from the following description, when considered with the accompanying drawings, wherein.

Figure 1:
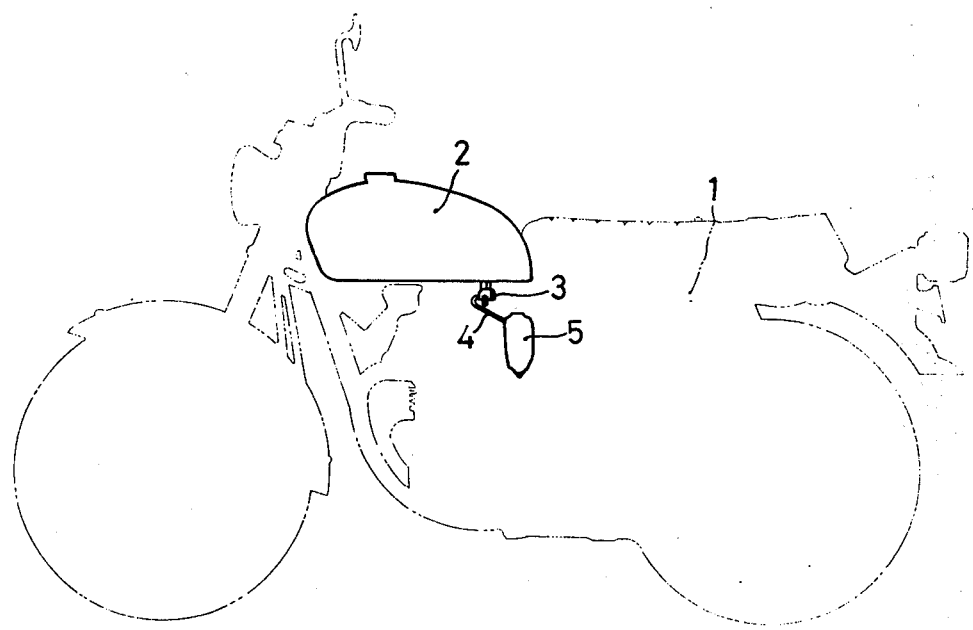
FIG. 1 is a side view of a motorcycle having the inventive apparatus installed thereon.

Referring to the drawings, numeral 1 denotes a motorcycle having a conventional frame body, a fuel tank 2 being shown on the upper front side thereof. The interior of the tank 2 is in communication, at its bottom portion, with the interior of a carburetor 5 that is usually provided below it, namely through a fuel passage 4 that has in the middle thereof a fuel cock 3, adapted for the usual manual opening and closing thereof.

Figure 2:
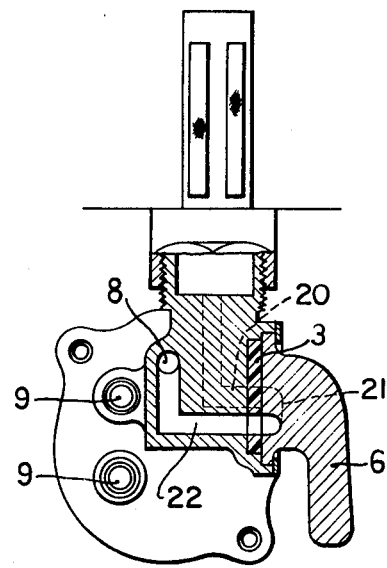
FIG. 2 is an enlarged rear view, partly in section, of a fuel cock portion of the apparatus.
Figure 4:
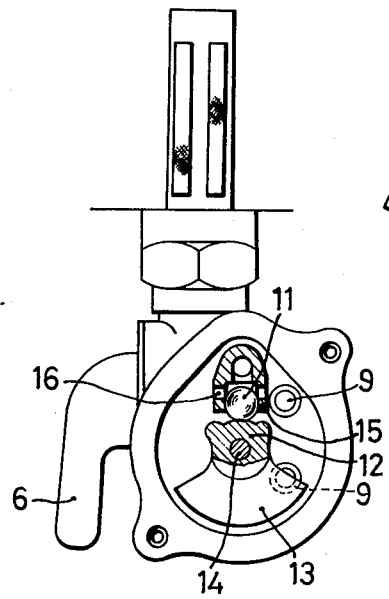
FIG. 4 is a front view of a portion of the apparatus.
Figure 5:
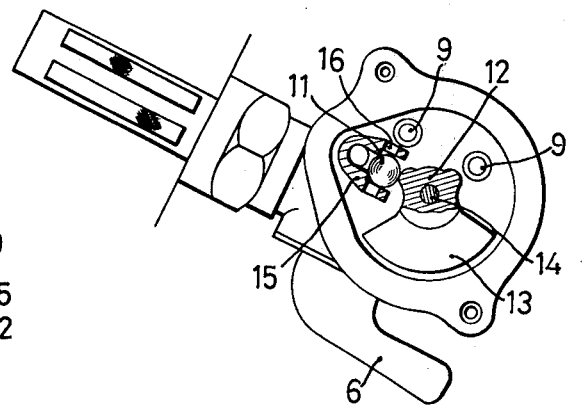
FIG. 5 is a front view of the same for explaining the operation of the inventive apparatus.

As can be seen in FIGS. 2, 4 and 5, the fuel cock 3 has on its front a turnable operating lever 6, while the side surface has a valve housing 7 thereon, preferably formed integrally therewith in a protruding fashion. The interior thereof is formed to constitute a portion of the fuel passage 4, connected to the downstream side of the cock 3 through an upper inlet opening 8, and a lower outlet opening 9, as shown.

The interior of the valve housing 7 is also provided with a valve opening 10 connected to the inlet opening 8 and with a ball-type safety valve, preferably a ball valve 11 that can be located on the lower side of the valve opening 10 so as to face the same. Additionally there is pivotally mounted a shaft 14 and a pendulum-type weight 13 having at its top portion a cam 12 for supporting the ball valve 11 from below.

Numeral 15 denotes a guide cylinder provided to surround the periphery of the valve 11, while 16 denotes a side opening made therein. The cam 12 is roughly square in form, and the weight 13 has a protrusion or extension at its lower portion, substantially in segmental form.

Figure 3:
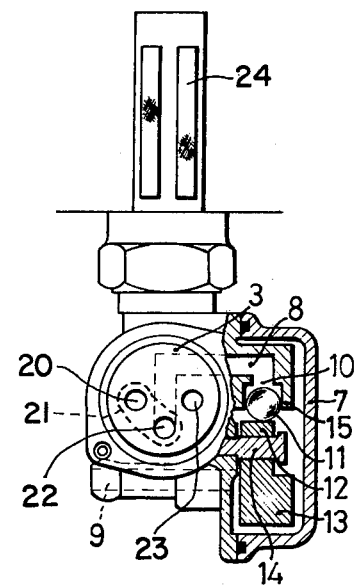
FIG. 3 is a side view, partly in section, of the same.

The operation of the inventive apparatus will now be explained as follows: normally, as shown in FIGS. 3 and 4, the valve 11 is released from being pushed by the cam 12 so that it is in its lower position, fuel being thus allowed to pass therethrough from the inlet opening 8 to the outlet opening 9. When the vehicle, e.g. the motorcycle, has been accidentally overturned, as shown in FIG. 5, to assume a tilted or inclined altitude, all of the inner constituents of the apparatus are also inclined. In this event, however, the weight 13 remains in its vertical attitude on account of gravity acting thereon, as for a suspended pendulum, so that the cam 12 on its top portion also remains kin the same position, so that the ball valve 11 moves along the outer surface of the cam 12. One of the protruding lobes of the cam will consequently push the ball 11 away from the cam, within the guide tube 15, so as to be brought into pressure contact with the valve opening 10. The latter is consequently closed, and accordingly no fuel can pass any more from the fuel tank 2 to the carburetor 5.

The fuel cock 3 has three ports 20, 22 and 23 and under ordinary conditions the ports 20 and 22 are interconnected through a groove 21 made in the operation handle 6. Thus, fuel within the fuel tank 2 is discharged therefrom through a filter tube 24 into the port 20 and is led to the inlet opening 8 through the groove 21 and the port 22. The port 25 is so prepared that the same is used only when the amount of fuel within the tank 2 becomes below a predetermined amount. Thus, the same is only for reserve use.

In the illustrated embodiment, two outlet openings 9,9 are provided so that fuel may be distributed to two carburetors. Namely, one is connected to a first carburetor and the other is connected to a second carburetor. Only a single opening 9 is needed when a single carburetor is used.

Summarizing, on accidental turnover of a vehicle, the pendulum-type weight 13 detects the inclination of the vehicle, by a change of its relative positioning with respect to the ball valve 11, so that the fuel passage 4 is automatically closed by the action of the cam 12, associated with the weight 13. Further flow of fuel from the tank is consequently automatically stopped so that the danger of a fire is prevented and eliminated.

It can be seen from the preceding description that the inventive apparatus is simple in construction, consequently relatively inexpensive to manufacture, while it is reliable, smooth and accurate in operation.

If the safety valve 11 is integrally constructed with the fuel cock 3, as illustrated, the passage of the latter can be effectively utilized, which makes it possible to construct the apparatus with an even smaller size, facilitating the mounting thereof to any type of vehicle.

It will be understood by those skilled in the art that various modifications, changes and/or additions can be made in the described apparatus without departing from the spirit and scope of the present invention.

What I claim is:

1. An apparatus for preventing fuel from leaking on accidental turnover of a vehicle, the latter having a fuel tank, a carburetor, and a passage communicating said tank with said carburetor; the apparatus comprising an ordinarily open safety valve such as a ball valve interposed in said passage, so arranged that, on the turnover of the vehicle, a pendulum-type weight detects the inclination of the vehicle, operating a cam to automatically close said safety valve; a manually operable fuel cock interposed in said passage, and a housing for said valve integrally formed therewith on one side thereof.

2. The apparatus as defined in claim 1, wherein said cam forms a continuation of said weight, with a substantially centrally disposed fulcrum therefor, said cam having at least one protruding lobe thereon, and said safety valve includes a slidable ball adapted to be pushed by said lobe of the cam into a position preventing flow of fuel from said passage to said carburetor.

3. The apparatus as defined in claim 2, wherein said safety valve further includes a guide member surrounding said ball and allowing the sliding thereof, in a direction toward and away from the fulcrum of said weight and said cam, with at least one lateral opening being provided in said guide member for the passage of the fuel.

* * * * *